(12) United States Patent
Edmett Stacey

(10) Patent No.: US 8,516,149 B1
(45) Date of Patent: Aug. 20, 2013

(54) SYSTEM FOR OPERATING NFSV2 AND NFSV3 CLIENTS WITH FEDERATED NAMESPACE

(75) Inventor: Christopher Howard Edmett Stacey, Christchurch (NZ)

(73) Assignee: EMC Corporation, Hopkinton, MA (US)

( * ) Notice: Subject to any disclaimer, the term of this patent is extended or adjusted under 35 U.S.C. 154(b) by 124 days.

(21) Appl. No.: 12/971,792

(22) Filed: Dec. 17, 2010

(51) Int. Cl.
*G06F 15/173* (2006.01)
*G06F 15/16* (2006.01)
*G06F 17/00* (2006.01)
*H04L 12/56* (2006.01)

(52) U.S. Cl.
CPC ......... *H04L 45/00* (2013.01); *Y10S 707/99955* (2013.01); *Y10S 707/99931* (2013.01); *Y10S 707/9994* (2013.01)
USPC ........... 709/238; 709/201; 709/203; 709/213; 709/214; 709/215; 709/216; 709/217; 709/218; 709/219; 709/226; 709/227; 709/228; 709/229; 709/230; 709/231; 709/232; 709/245; 709/246; 707/E17.005; 707/822; 707/E17.01; 707/E17.032; 707/827; 707/E17.006; 707/737; 707/E17.044; 707/999.204; 707/999.001; 707/999.01; 707/705; 707/781; 707/782; 707/783; 707/784; 707/785; 707/786; 707/787; 707/788; 707/769; 707/809; 707/609; 707/686; 707/610; 707/611; 707/612; 707/613; 707/614; 707/615; 707/616; 707/617; 707/618; 707/619; 707/620; 707/621; 707/623; 707/624; 707/625; 707/626; 707/627; 707/628; 707/629; 707/630; 707/631; 707/632; 707/633; 707/634; 707/635; 707/636; 707/637; 707/638; 707/639; 707/640; 707/641; 707/642; 707/643; 707/644; 707/645; 707/646; 707/647; 707/648; 707/649; 707/650; 707/651; 707/652; 707/653; 707/654; 707/655; 707/656; 707/657; 707/658; 707/659; 707/660; 707/661; 707/662; 707/663; 707/664; 707/665; 707/666; 707/667; 707/668; 707/669; 707/670; 707/671; 707/672; 707/673; 707/674; 707/675; 707/676; 707/677; 707/678; 707/679; 707/680; 707/681; 707/682; 707/683; 707/684; 707/685; 707/622; 714/3; 714/4.1; 714/42; 714/54; 714/E11.084; 711/111; 711/112; 711/113; 711/114; 711/117; 711/118; 711/119; 711/120; 711/121; 711/122; 711/123; 711/124; 711/125; 711/126; 711/127; 711/128; 711/129; 711/130; 711/131; 711/132; 711/133; 711/134; 711/135; 711/136; 711/137; 711/138; 711/139; 711/140; 711/213; 711/147; 711/148; 711/149; 711/150; 711/151; 711/152; 711/153; 711/154; 711/155; 711/156; 711/157; 711/158; 711/159; 711/160; 711/161; 711/162; 711/163; 711/164; 711/165; 711/166; 711/167; 711/168; 711/169; 711/170; 711/171; 711/172; 711/173

(58) Field of Classification Search
USPC ................. 709/201, 203, 213, 214, 215, 216, 709/217, 218, 219, 226, 227, 228, 229, 230, 709/231, 232, 238, 245, 246; 707/200, 822, 707/E17.01, E17.032, 827, E17.005, E17.006, 707/737, E17.044, 204, 1, 10, 705, 781–788, 707/769, 809, 609–686; 714/3, 4, 5, 6, E11.084, 8, 42, 54, 4.1, 4.11, 714/4.12; 711/111, 112, 113, 114, 117–140, 711/147–173, 213
See application file for complete search history.

(56) References Cited

U.S. PATENT DOCUMENTS

| | | | | |
|---|---|---|---|---|
| 6,996,674 | B2 * | 2/2006 | Chiu et al. | 711/118 |
| 7,401,129 | B2 * | 7/2008 | Negishi et al. | 709/219 |
| 7,865,462 | B2 * | 1/2011 | Hara | 707/610 |
| 7,966,517 | B2 * | 6/2011 | Shitomi et al. | 714/3 |
| 8,046,422 | B2 * | 10/2011 | Susarla et al. | 709/213 |
| 8,078,622 | B2 * | 12/2011 | Rabii et al. | 707/737 |
| 8,086,585 | B1 * | 12/2011 | Brashers et al. | 707/705 |
| 2003/0028819 | A1 * | 2/2003 | Chiu et al. | 714/5 |
| 2005/0021657 | A1 * | 1/2005 | Negishi et al. | 709/213 |
| 2007/0038697 | A1 * | 2/2007 | Zimran et al. | 709/203 |

| | | | | |
|---|---|---|---|---|
| 2007/0055703 | A1* | 3/2007 | Zimran et al. | 707/200 |
| 2007/0156506 | A1* | 7/2007 | Hara | 705/10 |
| 2008/0235328 | A1* | 9/2008 | Negishi et al. | 709/203 |
| 2008/0313258 | A1* | 12/2008 | Negishi et al. | 709/201 |
| 2009/0177720 | A1* | 7/2009 | Shitomi et al. | 707/204 |
| 2009/0240975 | A1* | 9/2009 | Shitomi et al. | 714/5 |
| 2010/0114889 | A1* | 5/2010 | Rabii et al. | 707/737 |
| 2011/0066596 | A1* | 3/2011 | Hara | 707/639 |
| 2011/0145363 | A1* | 6/2011 | Ananthanarayanan et al. | 709/218 |
| 2011/0145367 | A1* | 6/2011 | Ananthanarayanan et al. | 709/219 |
| 2011/0145499 | A1* | 6/2011 | Ananthanarayanan et al. | 711/118 |
| 2012/0011176 | A1* | 1/2012 | Aizman | 707/822 |

OTHER PUBLICATIONS

Network File System (NFS) version 4 Protocol, IETF RFC 3530, Apr. 2003.
Requirements for Federated File Systems, IETF RFC 5716, Jan. 2010.
NSDB Protocol for Federated Filesystems, IETF Internet Draft draft-ietf-nfsv4-federated-fs-protocol, Nov. 19, 2010.
Administration Protocol for Federated Filesystems, IETF Internet Draft draft-ietf-nfsv4-federated-fs-admin, Administration, Nov. 19, 2010.
Network File System (NFS) Version 4 Minor Version 1 Protocol, IETF RFC 5661. Jan. 2010.

* cited by examiner

*Primary Examiner* — Saket K Daftuar
(74) *Attorney, Agent, or Firm* — Krishnendu Gupta; Deepkia Bhayana

(57) ABSTRACT

An information retrieval system having: a client adapted for accessing a plurality of file sets stored on one of a plurality of file servers; a plurality of file servers configured to operate with a federated file system namespace; and a memory for storing re-direction information accessible by the client for identifying a request issued by the client for a file set at a first location in the namespace where the file set is located at a second, different location on one of the file servers and wherein the client in examining the re-direction information in the memory, re-directs the request to the second location in accordance with the re-direction information.

33 Claims, 4 Drawing Sheets

SYSTEM FOR OPERATING NFSV2 AND NFSV3 CLIENTS WITH FEDERATED NAMESPACE

TECHNICAL FIELD

This disclosure relates generally to federating namespace and more particularly to methods for federating namespace for NFSv2 and NFSv3 clients.

BACKGROUND AND SUMMARY

As is known in the art, the Internet Engineering Task Force (IETF) Federated File Systems (FedFS) working group is defining standards that leverage NFSv4 to federate multiple individual file systems or file sets such that NFSv4 clients will see them as a single file system namespace. The NFSv4 protocol provides a referral mechanism that allows a file server to redirect a NFSv4 client to another file server using a federated namespace (single global name space for a set of NFSv4 servers) using the NFSv4 protocol's referral capabilities. The file system federation protocol enables file access and namespace traversal across collections of independently administered file servers.

The standards allow for implementations that extend the single namespace to non-NFSv4 clients, such as CIFS or pre-NFSv4 clients (i.e., NFSv2 and NFSv3 clients, herein after referred to as NFSv2/3 clients) but do not specify how this might be achieved.

The NFSv4 Federated File System (FedFS) standards define the ability to create a single file system namespace by stitching together or federating multiple individual file set (i.e. file systems or portions of) hosted by multiple file servers. More particularly, with NFSv4 systems, the federation or namespace links file sets together using "junctions". A junction at one file set looks like a normal directory to NFSv4 clients by is in effect a pointer to another file set hosted by the same or a different file server. Junctions themselves do not store the location of the target file set. Instead, a junction stores a unique identifier of the file set to which it refers. The file set identifier is called a File Set Name (FSN). Each junction also stores the fully qualified domain name (FQDN) of a system of the LDAP directory that can be used to resolve the FSN to its current location (i.e. the FQDN and export of the file set on a file server). This namespace database is known as the NSDB and the location of a file set its File Set Location (FSL). Note that there may be multiple replicas of or ways to access a file set hence there can be multiple FSL entries associated with a single FSN in the NSDB.

When a user or application on an NFSv4 client attempts to navigate into or through a junction in the namespace the file server hosting the file system in which the junction resides extracts the File Set Name (FSN) and relevant NSDB information from the junction, contacts the NSDB to look up the current FSL's for the file set. The file server responds to the client with an NFSv4 "referral" (fs_locations or fs_locations_info defined in RFC 3530 and RFC 5661) that includes all or a sub-set of the FSL's for the file set concerned. The client then makes a connection to the target file server so that the user or application can continue browsing what appears to them as a single file system namespace.

For example, reference is made to FIG. 1. It is noted that the namespace is federated among the file server1 and file server2. Thus, here, in this example, directory "data" is in file server1 and directory "users" is in server2. The junction linking the two file servers, server1 and server2 is in server1 as "home" which is serviced by the NSDB, as indicated. In this example, the user wishes to access the path in the namespace "/home/c". First, the NFSv4 client lists the contents of the "/" or "root" directory on file server1 during the browse, "home" appears as to be a normal directory, so the client attempts to browse into it. Next, as a result of the browse, file server1 discovers that "home" is a namespace junction (namespace data base (NSDB)) and determines the location of "home" using the FedFS NSDB service (i.e., determines from the NSDB that the location is "server2:/users/c"). Next, file server1 returns an NFSv4 referral to the NFSv4 client directing it to server2's "/users". Next, the client accesses "/users/c" on file server2. Thus, with such a system, one file server, through the junction therein, redirects the request to a different file server within the system. The FedFS functionality outlined above works for NFSv4 clients and could easily be extended to CIFS clients with the inclusion of CIFS based FSL entries in the NSDB because both NFSv4 and CIFS protocols include the concept of a referral. That is, a response to a client telling them that the directory they are interested in does not reside at the location they are connected to. In the case of NFSv4 the referral also includes the location of the desired file set. In the case of CIFS the client gets this information in a separate exchange with a DFS server. Either way, the client ends up making a connection directly to the file server that is hosting the desired file set.

In contrast to NFSv4 and CIFS there is no concept of referrals or federated namespace in the NFSv2/3 protocols. A file server has no way to inform an NFSv2/3 client that a given directory represents an entry point to a file set that resides elsewhere. Having said that file server administrators have been building federated file system namespaces for NFSv2/3 clients for years using the "automounter" or "autofs" functionality built into most, if not all, NFSv2/3 clients operating systems.

The automount functionality on an NFSv2/3 client is configured to watch any user or application access to specified directories local to or mounted on the client. Whenever a user or application attempts to access one of the specified directories the automount daemon consults its automount table to determine what file set exported from a file server should be mounted at that location. The automount maps can be configured as local files or retrieved by the client from NIS or LDAP directory services.

As noted above, there is no concept of referrals in the NFSv2/3 client protocols and therefore there is no way for a file server to direct NFSv2/3 clients to where the file sets they are interested actually are located.

This disclosure describes three embodiments wherein an NFSv4 FedFS namespace is made available to NFSv2/3 clients. More particularly, methods whereby a file server participating in a file system namespace defined and managed via NFSv4 junctions and FedFS NSDB's extend that namespace to NFSv2/3 clients.

In accordance with the disclosure, an information retrieval system is provided having: a client; a file server system having a file set accessible by the client and configured to operate with a federated namespace; and a memory for storing re-direction information accessible by the client for identifying a request issued by the client for a file set at a first location in the namespace where the file set is located a second, different location and wherein the client in examining the re-direction information in the memory, re-directs the request to the second location in accordance with the re-direction information.

In one embodiment an information retrieval system is provided having: a client adapted for accessing a file set stored on one of a plurality of file servers; a plurality of file servers configured to operate with a federated namespace; and a memory for storing re-direction information accessible by the client for identifying a request issued by the client for a file set at a first location in the namespace where the file set is located a second, different location on one of the file servers and wherein the client in examining the re-direction information in the memory, re-directs the request to the second location in accordance with the re-direction information.

In one embodiment, the memory stores an automount map accessible to the client.

In one embodiment, the automount map stores the first location in the namespace from which the client must be re-directed to the second location also stored in the automount map.

In one embodiment, the memory stores a symbolic link relating the first location to the second location.

In one embodiment, the memory is in the server.

In one embodiment, the symbolic link in the namespace is the first location and a target of the symbolic link is the second location.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
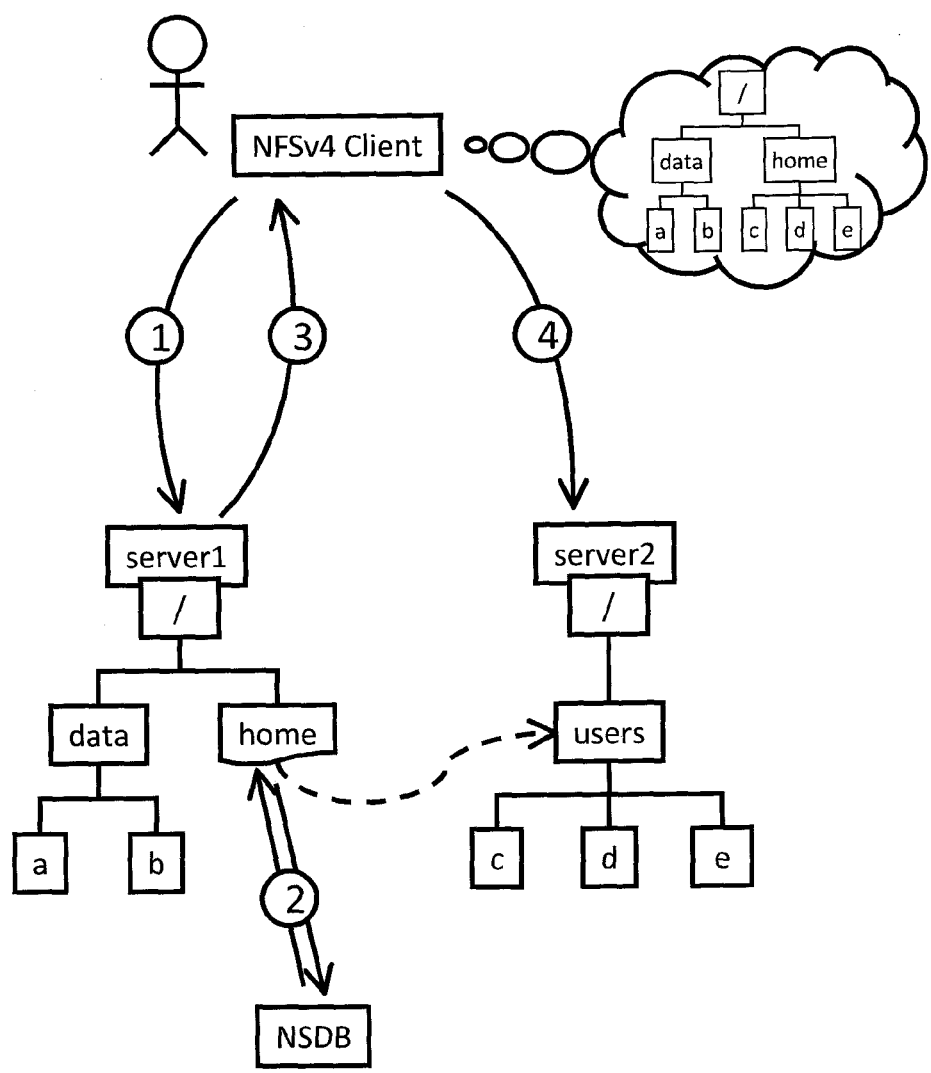
FIG. 1 is a diagram of an information retrieval system using junctions to construct a federated file system namespace having a plurality of file sets stored on a plurality of file servers and a NFSv4 client to access that federated namespace according to the PRIOR ART.
Figure 2:
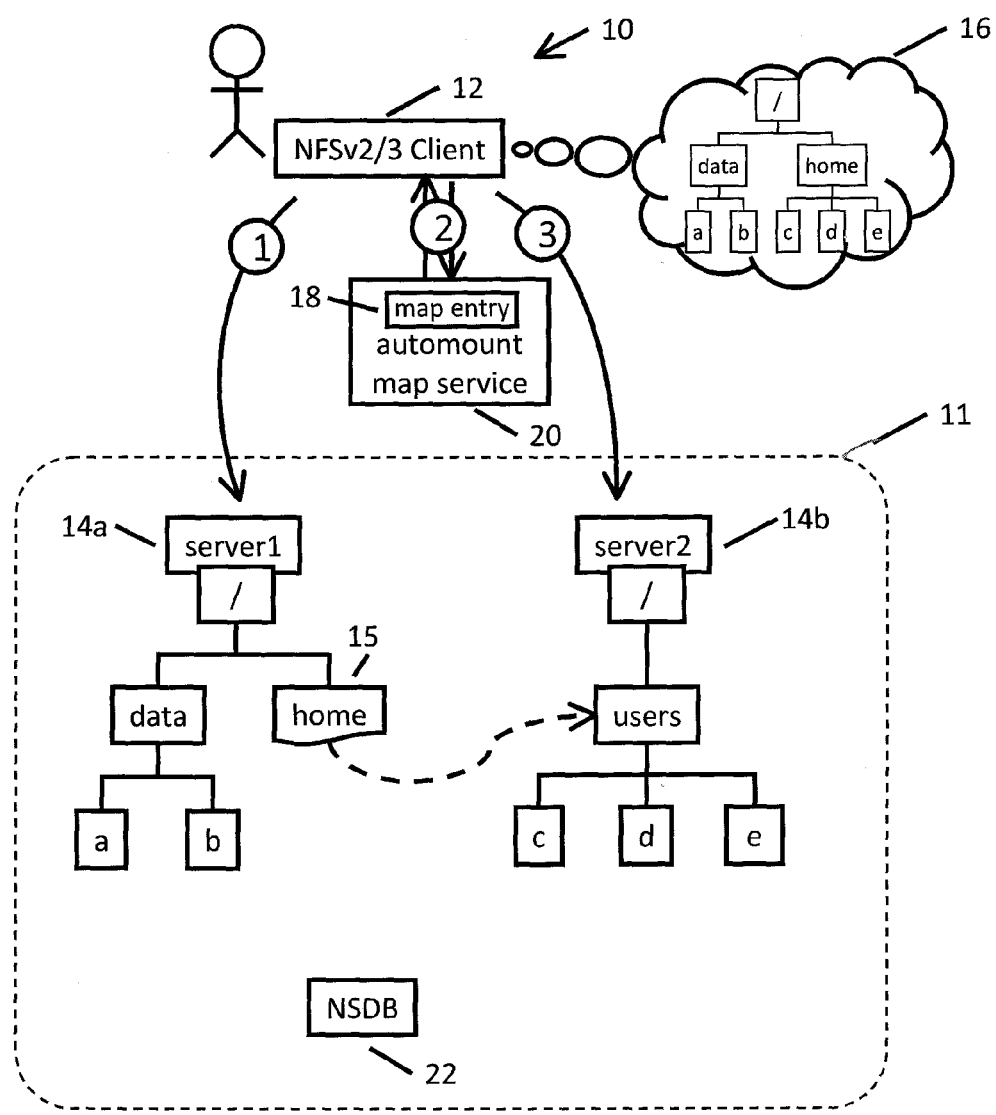
FIG. 2 is a diagram of an information retrieval system having a NFSv2/3 client for a file server system having a plurality of servers storing a federated namespace according to one embodiment of the disclosure.
Figure 3:
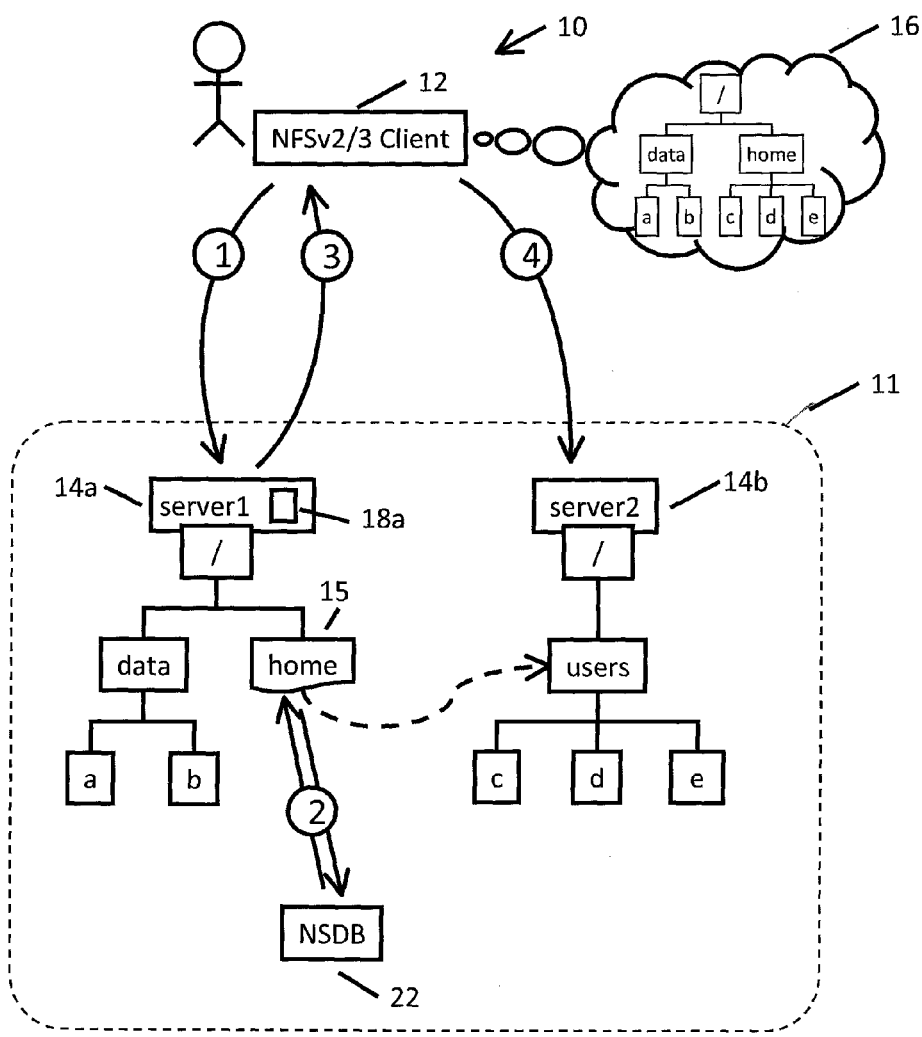
FIG. 3 is a diagram of an information retrieval system having a NFSv2/3 client for a file server system having a plurality of file servers storing a federated namespace according to another embodiment of the disclosure.
Figure 4:
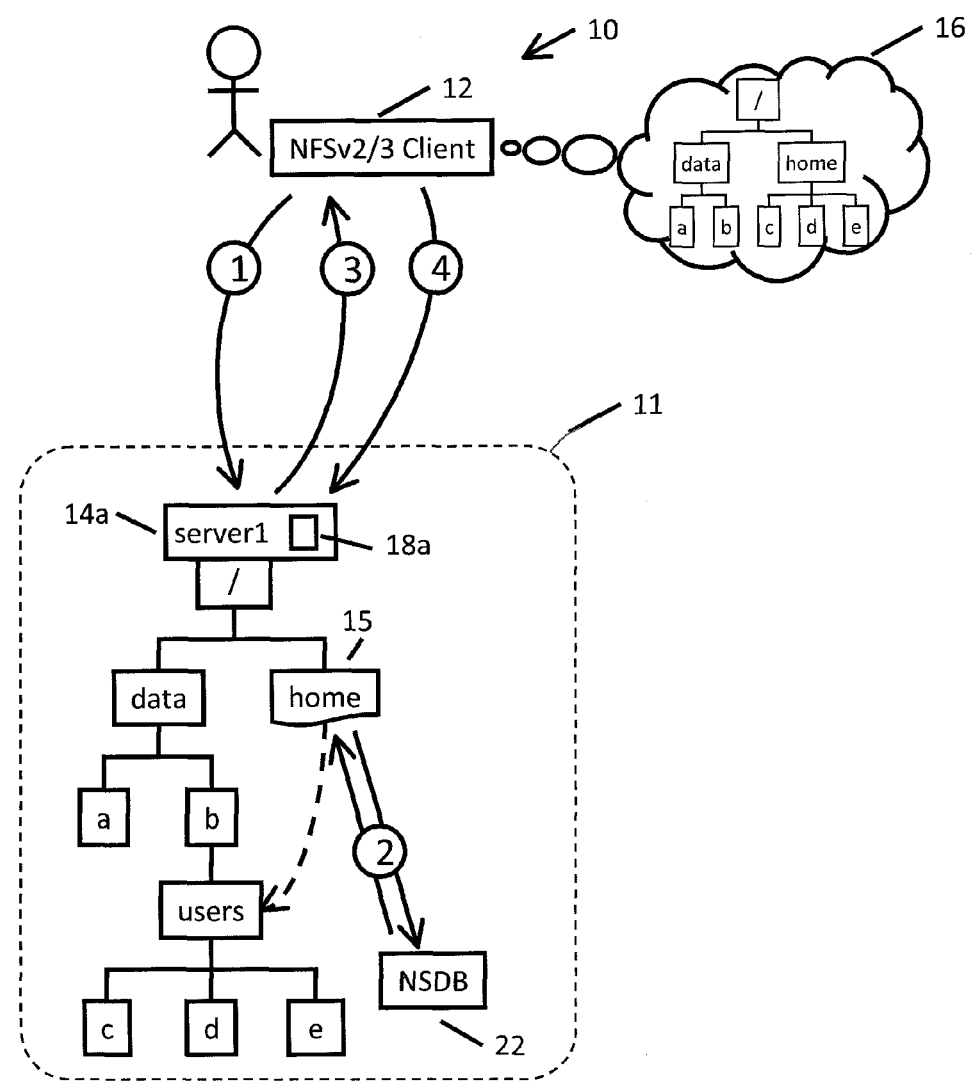
FIG. 4 is a diagram of an information retrieval system having a NFSv2/3 client for a file server system having a single file server storing a federated namespace according to another embodiment of the disclosure.

Referring now to FIGS. 2, 3 and 4, three information retrieval systems 10, 10; are shown respectively, each system having an information retrieval system having: a client 12, (here a NFSv2/3 client); a file server system 11 having a file set accessible by the client and configured to operate with a federated namespace 16; and a memory 18 for storing re-direction information accessible by the client 12, for identifying a request issued by the client 12 for a file set at a first location in the namespace 16 where the file set is located a second, different location and wherein the client 12 in examining the re-direction information in the memory 18, re-directs the request to the second location in accordance with the re-direction information.

FIGS. 2 and 3 show a client 12 (here a NFSv2/3 client) adapted for accessing a plurality of file servers 14a, 14b; and a plurality of file servers 14a, 14b configured to operate with a federated namespace 16. FIG. 4 shows file system 11 with a single server. The client 12 is adapted for accessing a file set stored on one of a plurality of file servers 14a, 14b in FIGS. 2 and 3 and FIG. 4 show a client 12 (here a NFSv2/3 client) adapted for accessing a single file server.

Referring first to FIGS. 2 and 3, the plurality of file servers 14a, 14b is configured to operate with a federated namespace. The client 12 is adapted for accessing a file set stored on one of a plurality of file servers 14a, 14b. The plurality of file servers 14a, 14b are configured to operate with a federated namespace. The system includes a memory 18, 18a for storing re-direction information accessible by the client 12 for identifying a request issued by the client 12 for a file set at a first location in the namespace 16 where the file set is located a second, different location on one of the file servers and wherein the client 12 in examining the re-direction information in the memory 18, 18a, re-directs the request to the second location in accordance with the re-direction information. In the embodiment in FIG. 2, the memory 18 stores an automount map entry accessible to the client. More particularly, the automount map stores the first location in the namespace from which the client must be re-directed to the second location also stored in the automount map. In the embodiment in FIG. 3, the memory 18a is in the server 14a and stores a symbolic link relating the first location to the second location. The location of the symbolic link in the namespace is the first location and a target of the symbolic link is the second location.

JUNCTIONS AS DIRECT AUTOMOUNT POINTS

NSDB Rendering to a Direct Automount Map

Referring to FIG. 2, the client 12, here an NFSv2/3 client, is adapted to retrieve files from file sets from a file server system 11 having a plurality of servers 14a, 14b, here for illustration purposes, two file servers (i.e., server1 and server2), it being understood that more than two servers may be provided to the client. As noted above, the namespace 16 is federated (distributed) among the file servers 14a, 14b. Further, server1 14a has a junction "home" 15 that it refers to a file set, "users", that is located on server2 14b. It is noted that if the client 12 were an NFSv4 client, server1 14a would refer the client 12 to server2 14b by obtaining the location of the requested file set from the NSDB 22 and sending that information to the client 12 in an NFSv4 referral; here, however, the client 12 is an NFSv2/3 client and will not recognize the NFSv4 referral. Here, the memory 18 is an automount map. The automount map includes an entry providing the location of the file set of interest that would have been provided via an NFSv4 referral in an NFSv4 client system.

More particularly, whenever a junction 15 is created in the namespace, an entry is created in the direct automount map (i.e., memory 18) for the path to the junction 15 so that when the NFSv2/3 client 12 attempt to browse into or through the junction 15 the automount map functionality will trigger on the directory that represents the junction 15 and the NFSv2/3 client 12 will make a new connection to the actual location of the target file set; here, in this example, to "/users" in file server2 14b in response to request by the NFSv2/3 client 12.

Still more particularly, empty directories are presented to NFSv3 clients and the namespace structure is exported or published from the NSDB 22 into the directory of the memory 18 as a direct automount table that directs NFSv2/3 client 12 to mount the individual file sets on top of the empty junction directories locally (i.e., located within the memory 18). The NFSv2/3 client 12 obtains the rendered automount map via the normal mechanisms (e.g. local files, NIS, NIS+ or LDAP). The result is the same as if the NFSv2/3 client 12 supported referrals in that whenever a user or application navigated into or through a junction 15 in the namespace the client 12 will mount the target file set at that location and the user or application would be able to navigate into it.

For example:

Assume we have namespace path /a/b/c where c is a junction that refers to fileserver1:/fs1

Whenever a junction is added to the namespace the namespace management entity must create an entry in the direct automount map that represents the namespace. If that automount map is consumed by the NFSv2/3 clients 14a, 14b as a local file, each client's local copy must be updated as well. A preferable option would be for the namespace automount map to be stored in a NIS, NIS+ or LDAP directory service. In either case the automount daemon on each NFSv2/3 client 12 must be prompted to reread the namespace automount map using the standard automount commands on each client.

NFSv4 clients see c as a directory and when they traverse into c they get an NFSv4 fs_locations or fs_locations_info referral to fileserver1:/fs1.

NFSv2/3 clients 12 see c as a directory and when they traverse into it the local automount deamon will look up the path /a/b/c in the namespace direct map and mount the target file set fileserver1:/fs1 onto directory c.

Where there are multiple replicas of the file set available the prioritization can be reflected from the NSDB 22 into the automount map using the standard automount map syntax for prioritization of multiple targets. Where are multiple replicas of equal priority the replica selection mechanisms built into the client automount deamon will select the optimal replica.

Referring more particularly to FIG. 2, assume in this example:

The user wants to access /home/c. When the junction home was created the file set location information was added to a direct automount map used by the client 12 that maps /home to server2:/users.

The search is requested. First, the NFSv2/3 client 12 lists the contents of the / directory on server 1 (14a); home appears as to be a normal directory, so the client 12 attempts to browse into it. Next, the client 12 discovers that home is an automount point and determines its target using the automount map service 20 and the information contained in the memory 18 associated with the map entry that relates to the junction of interest. Next, the client 12 accesses /users/c on server2 (14b).

Thus, memory 18 storing re-direction information accessible by the client 12 for identifying a request issued by the client 12 for a file set at a first location (here home) in the namespace 16 where the file set (users) is located a second, different location on one of the file servers 14b and wherein the client 12 in examining the re-direction information in the memory 18, re-directs the request to the second location (users) in accordance with the re-direction information. Here the memory 18 stores an automount map accessible to the client 12. More particularly, the automount map 18 stores the first location (home) in the namespace from which the client 12 must be re-directed to the second location (users) also stored in the automount map 18. JUNCTIONS AS SYMBOLIC LINKS Rendering Junctions as Symbolic Links Referring to FIG. 3, a method and system for creating a federated namespace for NFSv2/3 clients by having the file server system 11 render junctions as symbolic links to the canonical automount path to the file set is illustrated. More particularly, the file server system includes a plurality of file servers 14a,14b and renders junctions as directories for NFSv4 clients as usual; here however, for NFSv2/3 client 12, such file servers 14a,14b render junctions as symbolic links that point to one of the locations of the file set. Still more particularly, the file server 14a presents a junction (here "home") as symbolic link that points to the "/net/<hostname>" canonical path to the target file set.

For example:

Assume we have namespace path/a/b/c c is a junction that refers to fileserver1:/fs1

NFSv4 clients see c as a directory and when they traverse into c they get an NFSv4 fs_locations or fs_locations_info referral to fileserver1:/fs1.

NFSv3 clients see c as a symbolic link that points to the c→/net/fileserver1/fs1.

On most, if not all, UNIX/Linux distributions /net is by default configured as an autofs directory that uses a special automount map that keys off the hostname. It assumes that the map key is the hostname of an NFSv2/3 client. The automount daemon dynamically constructs a map entry from the server's list of exported file systems. References to a directory under /net/fileserver1 will refer to the corresponding directory relative to the root of fileserver1.

Again, leveraging the automounter in this way has the same sort of effect for NFSv3 clients as a referrals have for NFSv4 and CIFS clients.

An advantage of this scheme over the generation of an explicit namespace automount map is there no need to make any configuration changes on the NFSv3 clients either to set the system up initially or as junctions or the path leading to them is created, modified or deleted.

Referring more particularly to FIG. 3, assume in this example:

Here, the user wants to access /home/c. First, the NFSv2/3 client lists the contents of the / directory on server 1 (14a). Next, server1 (14a) discovers that home is a namespace junction and determines its location using the FedFS NSDB service. Next, server 1 (14a) renders home as a symbolic link that refers to the well known network path to /users on server2 (14b), that is /net/server2/users. Next, the client 12 follows the home symbolic link in the standard way and accesses /users/c on server2.

Thus, memory 18a storing re-direction information accessible by the client 12 for identifying a request issued by the client 12 for a file set at a first location (here home) in the namespace 16 where the file set (users) is located a second, different location on one of the file servers 14b and wherein the client 12 in examining the re-direction information in the memory 18a, re-directs the request to the second location (users) in accordance with the re-direction information. Here the memory 18a is in the server 12 and stores a symbolic link relating the first location (home) to the second location (users). The symbolic link in the namespace is the first location (home) and a target of the symbolic link is the second location (users).

A number of embodiments of the disclosure have been described. Nevertheless, it will be understood that various modifications may be made without departing from the spirit and scope of the disclosure. For example, FIG. 4 illustrates a federated namespace where a plurality of file sets are located on a file server system having a single file server 18a and hence rather than junctions such as 15 referring clients to another file server, they refer them to a different path on the same file server 18a. For example, assume the user wants to access /home/. The NFSv2/3 client lists the contents of the / directory on server1. Next server1 discovers that home is a namespace junction and determines its location using the FedFS NSDB service. Next server1 renders home as a symbolic link that refers to well known network path to users on server1, that is /net/server1/data/b/users. Next, the client follows the home symbolic link in the standard way and accesses /data/b/users/c on server 1. Accordingly, other embodiments are within the scope of the following claims.

What is claimed is:

1. An information retrieval system, comprising:
   a NFS version 2 or 3 client, wherein the NFS version 2 or 3 client operating without junctions support;
   a file server system accessible by the client and operating with a NFS version 4 federated namespace, wherein file sets therein are linked together using junctions;
   a memory storing re-direction information accessible by the NFS version 2 or 3 client for identifying a request issued by the NFS version 2 or 3 client for the file set at a first location in the NFS version 4 federated namespace of the file server where the file set is located at a second, different location and wherein the client examining the re-direction information in the memory, re-directs the request to the second location in accordance with the re-direction information.

2. The information retrieval system recited in claim 1 wherein the file server system includes a plurality of file servers operating with the NFS version 4 federated namespace.

3. The information retrieval system recited in claim 2 wherein the memory stores an automount map accessible to the client.

4. The information retrieval system recited in claim 3 wherein the automount map stores the first location in the namespace from which the client must be re-directed to the second location also stored in the automount map.

5. The information retrieval system recited in claim 2 wherein the memory stores a symbolic link relating the first location to the second location.

6. The information retrieval system recited 5 wherein the memory is in the server.

7. The information retrieval system recited in claim 5 wherein the symbolic link in the namespace is the first location and a target of the symbolic link is the second location.

8. The information retrieval system recited in claim 1 wherein the file server system includes a single server operating with the federated namespace.

9. The information retrieval system recited in claim 8 wherein the memory stores a symbolic link relating the first location to the second location.

10. The information retrieval system recited 9 wherein the memory is in the server.

11. The information retrieval system recited in claim 10 wherein the symbolic link in the namespace is the first location and a target of the symbolic link is the second location.

12. An information retrieval system, comprising:
   a file server system operating with federated namespace wherein file sets therein are linked together using junctions;
   a client, including an NFS version 2 or 3, having access to the file server system, wherein the client operating without support for the junctions provided by the file server;
   a memory storing re-direction information accessible by the client being operating without support for the junctions provided by the file server for identifying a request issued by the client operating without support for the junctions provided by the file server for a file set at a first location in the federated namespace where the file set is located at a second, different location and wherein the client examining the re-direction information in the memory, re-directs the request to the second location in accordance with the re-direction information.

13. The information retrieval system recited in claim 12 wherein the file server system includes a plurality of file servers operating with the federated namespace.

14. The information retrieval system recited in claim 13 wherein the memory stores an automount map accessible to the client.

15. The information retrieval system recited in claim 14 wherein the automount map stores the first location in the namespace from which the client must be re-directed to the second location also stored in the automount map.

16. The information retrieval system recited in claim 13 wherein the memory stores a symbolic link relating the first location to the second location.

17. The information retrieval system recited 16 wherein the memory is in the server.

18. The information retrieval system recited in claim 16 wherein the symbolic link in the namespace is the first location and a target of the symbolic link is the second location.

19. The information retrieval system recited in claim 12 wherein the file server system includes a single server operating with the federated namespace.

20. The information retrieval system recited in claim 19 wherein the memory stores a symbolic link relating the first location to the second location.

21. The information retrieval system recited 20 wherein the memory is in the server.

22. The information retrieval system recited in claim 21 wherein the symbolic link in the namespace is the first location and a target of the symbolic link is the second location.

23. An information retrieval system, comprising:
   a file server system operating with federated namespace wherein file sets therein are linked together using junctions;
   a NFS version 2 or 3 client having access to the file server system, wherein the NFS version 2 or 3 client operating without junctions support;
   a memory storing re-direction information accessible by the NFS version 2 or 3 client for identifying a request issued by the NFS version 2 or 3 client for a file set at a first location in the federated namespace where the file set is located at a second, different location and wherein the NFS version 2 or 3 client examining the re-direction information in the memory, re-directs the request to the second location in accordance with the re-direction information.

24. The information retrieval system recited in claim 23 wherein the file server system includes a plurality of file servers operating with the federated namespace.

25. The information retrieval system recited in claim 24 wherein the memory stores an automount map accessible to the client.

26. The information retrieval system recited in claim 25 wherein the automount map stores the first location in the namespace from which the client must be re-directed to the second location also stored in the automount map.

27. The information retrieval system recited in claim 24 wherein the memory stores a symbolic link relating the first location to the second location.

28. The information retrieval system recited 27 wherein the memory is in the server.

29. The information retrieval system recited in claim 27 wherein the symbolic link in the namespace is the first location and a target of the symbolic link is the second location.

30. The information retrieval system recited in claim 23 wherein the file server system includes a single server operating with the federated namespace.

31. The information retrieval system recited in claim 30 wherein the memory stores a symbolic link relating the first location to the second location.

32. The information retrieval system recited 31 wherein the memory is in the server.

33. The information retrieval system recited in claim 32 wherein the symbolic link in the namespace is the first location and a target of the symbolic link is the second location.

\* \* \* \* \*